United States Patent
Ho

(10) Patent No.: US 7,116,312 B2
(45) Date of Patent: *Oct. 3, 2006

(54) COMPUTER KEYBOARD WITH VESSEL CONTAINING TWO LIQUIDS AND A DECORATIVE ELEMENT

(75) Inventor: Stanley Ho, Warren, NJ (US)

(73) Assignee: Allure Home Creation Co., Inc., Boonton, NJ (US)

( * ) Notice: Subject to any disclaimer, the term of this patent is extended or adjusted under 35 U.S.C. 154(b) by 337 days.

This patent is subject to a terminal disclaimer.

(21) Appl. No.: 10/655,990

(22) Filed: Sep. 5, 2003

(65) Prior Publication Data

US 2005/0052421 A1    Mar. 10, 2005

(51) Int. Cl.
G09G 5/00    (2006.01)

(52) U.S. Cl. ............... 345/168; 345/157; D14/392; 400/714

(58) Field of Classification Search ........... 345/168, 345/156, 157; D14/391–392, 396, 399; 400/714
See application file for complete search history.

(56) References Cited

U.S. PATENT DOCUMENTS

| | | | | |
|---|---|---|---|---|
| 5,948,520 A | 9/1999 | Hirsch | ............... | 428/304.4 |
| 6,016,138 A | 1/2000 | Harskamp et al. | ............... | 345/163 |
| 6,066,021 A | 5/2000 | Lee | ............... | 446/77 |
| 6,106,909 A | 8/2000 | Hirsch | ............... | 428/13 |
| 6,117,502 A | 9/2000 | Liao | ............... | 428/13 |
| 6,138,870 A | 10/2000 | Lin | ............... | 222/78 |
| 6,155,411 A | 12/2000 | Ho | ............... | 206/77.1 |
| 6,160,540 A | 12/2000 | Fishkin et al. | ............... | 345/184 |
| 6,380,926 B1* | 4/2002 | Ho | ............... | 345/163 |
| 6,697,051 B1* | 2/2004 | Lee | ............... | 345/163 |
| 6,886,022 B1* | 4/2005 | Lee | ............... | 708/100 |

FOREIGN PATENT DOCUMENTS

EP    0 899 650 A2    3/1999

* cited by examiner

*Primary Examiner*—Kent Chang
(74) *Attorney, Agent, or Firm*—Frommer Lawrence & Haug LLP

(57) ABSTRACT

A computer keyboard device comprising a decorative sealed vessel comprising a first liquid, a second liquid, and at least one structure. The structure is insoluble in both the first and second liquids, and floats on the first liquid. The first and second liquids are immiscible and the first and second liquids have densities such that the first liquid is beneath the second liquid. The structure can maintain its upright position and remain in suspension permanently. The decorative sealed vessel is an integral portion of the computer keyboard.

14 Claims, 3 Drawing Sheets

COMPUTER KEYBOARD WITH VESSEL CONTAINING TWO LIQUIDS AND A DECORATIVE ELEMENT

FIELD OF THE INVENTION

The present invention relates to a decorative utilitarian object having a sealed decorative vessel connected, fused, annealed, or removably contained within a utilitarian object, for example, a computer keyboard.

The present invention also provides a utilitarian object, such as a computer keyboard, having at least one sealed decorative vessel connected to a useful object, wherein the decorative vessel can be connected to or fused or annealed to or removably contained or is an integral part of the useful object. The at least one sealed decorative vessel can be sized as desired and may make up one or more small or larger portions of the keyboard.

The at least one sealed decorative vessel can contain at least one three-dimensional insoluble decorative structure or sculpture and/or at least one fluid, preferable two immiscible fluids each having a different density. When present, the three-dimensional insoluble structure is capable of being suspended and floats on top of one of the two immiscible liquids. The Three-dimensional insoluble structure can resemble animals, e.g., birds, mammals, insects and/or plants.

Thus the invention can relate to at least one sealed decorative vessel affixed to a computer keyboard, and can contain at least one liquid, but preferable two, the two liquids can be different, can be miscible or immiscible. The liquids can have same or different densities, and if different densities, one liquid will be positioned atop the other. The liquid can be a fluid such as air, or that which is normally liquid including, but not limited to water, oil or any type, that could be clear or viscous etc. The at least one sealed decorative vessel can contain can contain at least one decorative particle that can be three-dimensional, such as a sculpture, or a two-dimensional object such as a picture or a drawing or any words or any design or any color of desire. The decorative particle is preferably insoluble in the liquids, preferably somewhat weighted, so it floats on one liquid and is immersed in the other liquid within the second vessel so it can move freely within the sealed second vessel and can remain in suspension. Either one or both of the liquids can be colored, or either one or both can be clear and the sculpture can be decorative that resembles any living thing or any object found on earth or imaginary.

Documents cited in the following text are incorporated herein by reference.

BACKGROUND OF THE INVENTION

In the era of computer data processing and the popularity of the word processing and other programs and the information super highway, obviously, a keyboard for use with a computer is required. The basic features of a keyboard include a housing that can be angled as necessary to be comfortable for a user, and a plurality of keys to be touched by a user to generate a corresponding letter on a computer screen, or to invoke a corresponding function. However, a computer keyboard has never been provided with a decorative sealed vessel having liquids contained within to be connected to, fused, annealed, permanently connected, or removably attached, or removably contained within the functional portion of a computer keyboard, such as the housing, or any of the keys. In fact, one will not be motivated to make a liquid containing embodiment as a part of an electronic device, such as a computer keyboard for fear that if the liquid containing embodiment leaks, the liquid could short circuit and destroy the entire computer system. Thus, there is neither teaching nor motivation in the art to do so.

A sealed container containing two immiscible liquids, one or both of which is optionally colored is known; for instance, a "wave" device which pivots back and forth generates the appearance of a wave. In addition, it is also known in the art to suspend and/or dispose a three-dimensional sculpture atop one of the two immiscible fluids. Such container is commonly shaped as a paperweight. However, it is believed that heretofore a computer keyboard has not been combined with such sealed container.

Reference is made to Taiwanese laid-open publication No. 340349 laid open on Sep. 11, 1998, which is believed not to disclose or claim the present invention.

OBJECTS AND SUMMARY OF THE INVENTION

An object of the present invention is for a novel, useful utilitarian device, such as a computer keyboard, having a sealed decorative vessel connected to or attached to or fused to or removably contained within or is an integral part of a utilitarian device. The utilitarian object can be, but not limited to, a computer keyboard. The sealed decorative vessel can be placed at any portion of the housing of the computer keyboard, or even within any key of the computer keyboard.

The present invention provides a computer keyboard comprising a sealed vessel containing at least one fluid, at least one structure that can be two-dimensional or three-dimensional, wherein the structure is insoluble in the fluid disposed within the sealed vessel, and floats on the fluid and the sculpture is capable of being temporarily in suspension when the sealed vessel is in motion. If the sealed vessel is to have more than one fluid, the fluids are immiscible; the first and second liquids have different densities such that the first liquid is beneath the second liquid and vice versa; and the volume of the second liquid may be the same, smaller or greater than the volume of the first liquid and vice versa.

The sealed vessel can be permanently attached to or affixed to the computer keyboard so as to be integral with, as in a non-removable from, or it can be removably attached like a module or a Lego® set that can be snapped-in or removed from the computer keyboard. The process of permanently attaching the sealed vessel may include fusing, gluing, molding, welding, melting, annealing or any other method that would render the sealed vessel permanently attached to the keyboard.

The sealed vessel contains at least one liquid and at least one particle. The particle can be three-dimensional or two-dimensional, and if three-dimensional can optionally be a sculpture. The particle is insoluble in the liquids disposed in. The three-dimensional or two-dimensional particle is preferably weighted, so it floats on one liquid and is immersed in the other liquid within the sealed vessel. Either one or both of the liquids can be colored or colorless or clear, or they can have contrasting or complimentary colors and the sculpture can be, for example, decorative, scenic, informative, advertising, political, comical, entertaining or any combination thereof that pleases a user and designs to a user's liking to reflect a user's individualism.

The insoluble, three-dimensional sculpture could resemble animals, i.e., birds, mammals, insects and/or plants, and could take the shape of a fish, frog, boat, duck, turtle, swan, dolphin, penguin and the like. The sculpture could also convey company information or take the form of a company logo or represent a favorite sports team, a movie star, a motion picture, a favorite character either cartoon, imaginary or real. The insoluble particle can also be two-dimensional which can serve to provide a background to advertise, to preach, to campaign for political leaders, it can also be inspirational or philosophical statements, or comical characters, or cartoon characters in either two or three dimensions. The decorative particle can also be contemplated to be affixed inside the sealed vessel so as to remain essentially stationary during agitation of the liquids and/or the environment it is disposed in. There is preferably at least one insoluble three-dimensional sculpture and each is preferably weighted at the bottom as to provide, ensure and maintain an upright position irrelevant to the position of the decorative vessel.

The sealed vessel can have discrete portions which prohibit viewing of the entire or a portion of the contents of the vessel. Thus, the sealed vessel can be selectively clear, transparent, translucent, colored, frosted or any combinations thereof. Further, the walls of the sealed vessel can be made of materials such as glass, plastic, polymer, resin of varying thickness, The sealed vessel can be any desired color including clear, translucent, frosted or the like.

The present invention can function as identify the source or origin of the product, to distinguish the product from those of others, and, to convey an image.

In this disclosure, "comprising", "comprises" and the like can have the meaning ascribed to them in U.S. Patent Law and can mean "includes", "including", and the like.

These and other objects and embodiments of the invention are provided in, or are obvious from, the following detailed description. These drawings are by way of example are by no means limiting to the invention.

BRIEF DESCRIPTION OF THE DRAWINGS

In the following detailed description, reference will be made to the accompanying drawings, wherein.

DETAILED DESCRIPTION

Figure 1:
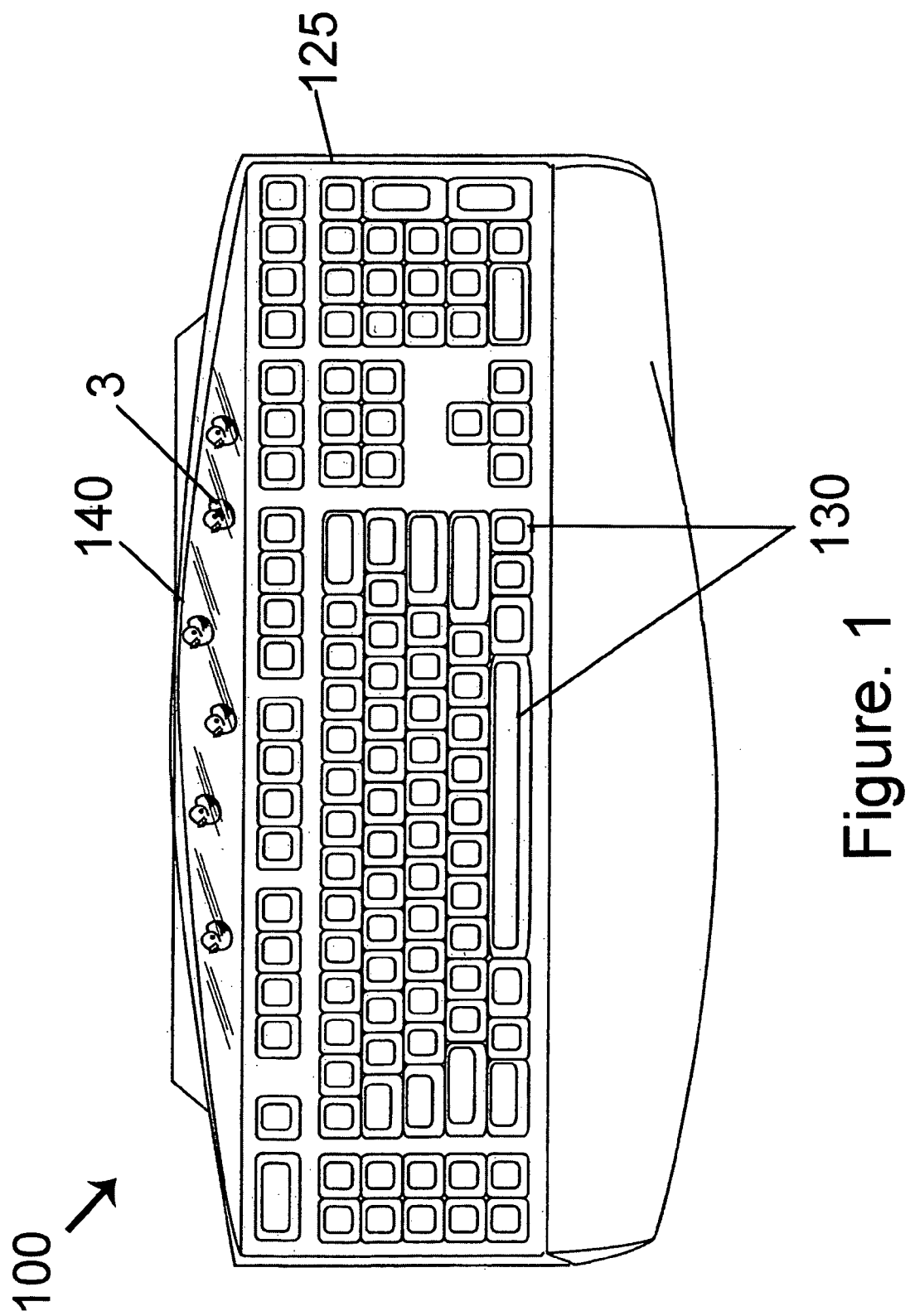
FIG. 1 shows a top plan view of a computer keyboard constructed in accordance with a first embodiment of the invention.
Figure 2:
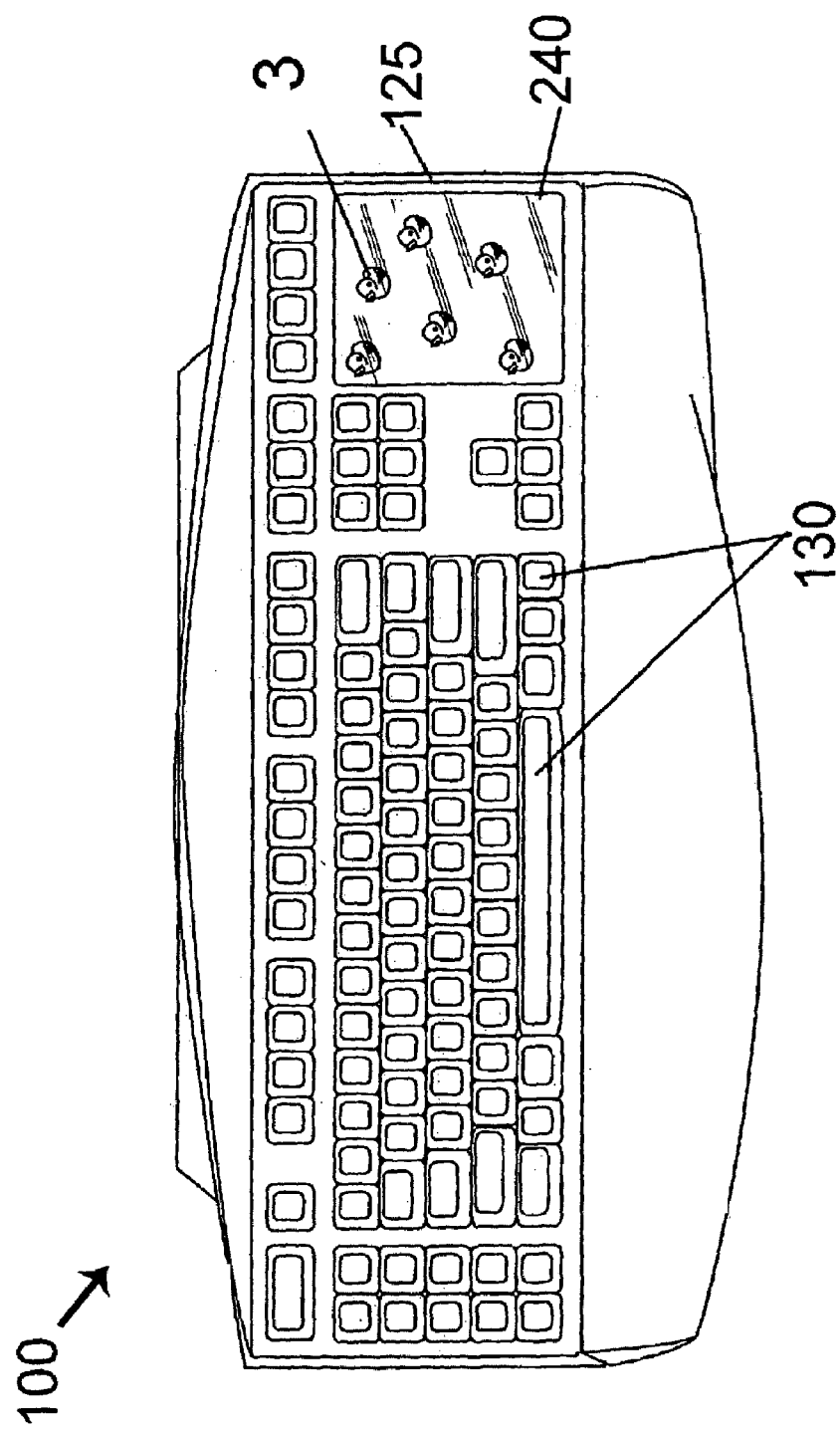
FIG. 2 shows a perspective view of a computer keyboard constructed in accordance with a second embodiment of the invention.

As will be appreciated from the following, FIGS. 1 and 2 depict a computer keyboard 100 comprised of a main housing 125, one or more keys 130, and a decorative sealed vessel 140, 240 at various locations of the computer keyboard. Main housing 125 can be formed from a rigid or soft or flexible material, preferably plastic or polymer, or resin or any suitable material. Decorative sealed vessel 140, 240 can be positioned at any position of main housing 125, may take the place of any key 130, be positioned in any other desired position, and may be formed in any shape desired.

Figure 3:
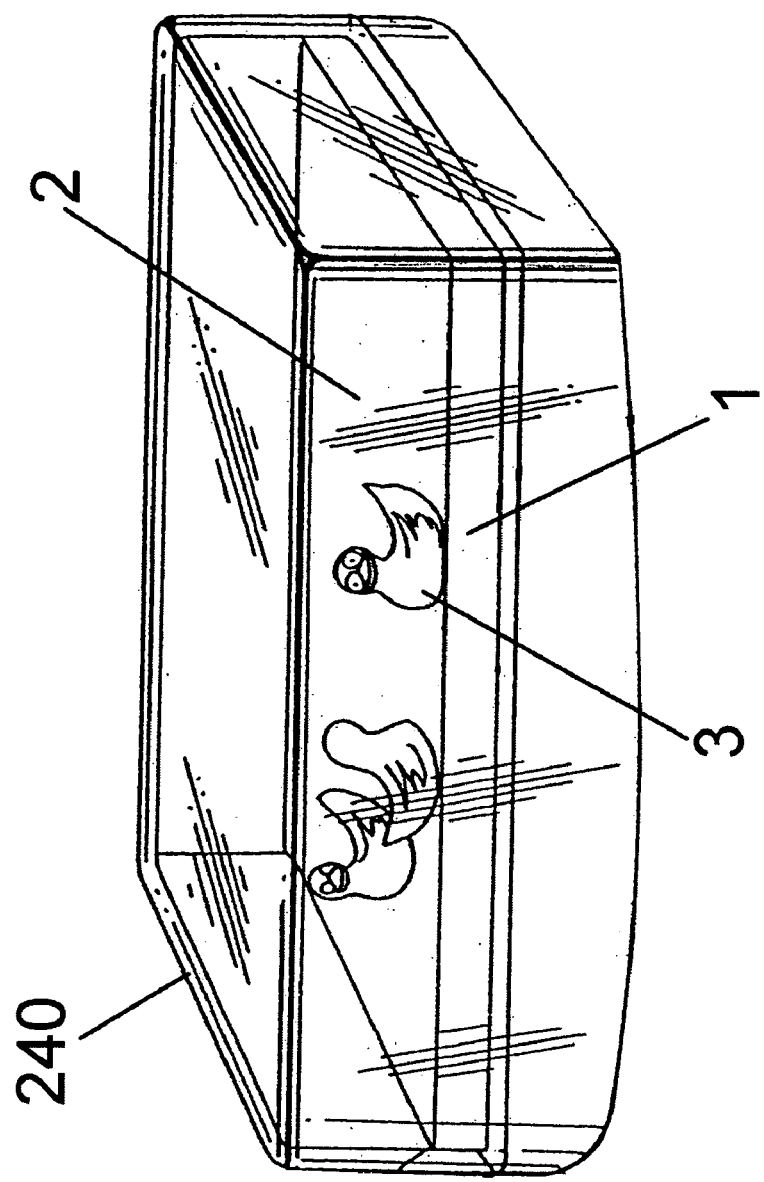
FIG. 3 is a perspective view of a decorative sealed vessel constructed in accordance with the invention.

The sealed vessel 140, 240 can contain a first liquid 1, a second liquid 2 and at least one decorative structure 3 suspended and contained within the sealed vessel 140, 240 wherein first liquid, or second liquid or both the first and the second liquids are optionally-colored (see FIG. 3 depicting such a sealed vessel that may be coupled with a keyboard in accordance with the invention). The decorative structure 3 is weighted as to maintain and ensure an upright configuration and wherein the decorative structure 3 is insoluble in both the first and the second liquids and floats on the first liquid and is within the second liquid. Decorative sealed vessel 140, 240 can have discrete portions that prohibit viewing of the contents of the vessel. Thus, the sealed vessel can be selectively clear, transparent, translucent, colored, frosted or any combinations thereof. Further, the walls of the sealed vessel can be made of materials of varying thickness, thereby producing a magnifying effect when the objects within the vessel are viewed. Thus, FIGS. 1 and 2 present an aesthetically pleasing keyboard device. In addition, the computer keyboard can be shaped and sized as a traditional computer keyboard, or any shape or size desired or it can be shaped to coordinate with, in contrast to or compliment the decorative structure disposed within the sealed vessel.

The decorative structure can be a sculpture or a three dimensional particle or other aesthetically pleasing device or a two-dimensional drawing; or can be a form of advertisement, such as a trademark or logo (which also can be on the face of the first or second vessels).

It is to be further understood that any utilitarian description herein of any component of the computer keyboard of the invention is not to be construed as a statement that the appearance of any component of the invention is necessarily only functional in nature. Surface ornamentation or configuration of the container or any components thereof is attributable to ornamental considerations. Additionally, while a computer keyboard has been described, the invention is equally applicable to any other type of keyboard apparatus, including a calculator, accounting adding machine or the like.

Having thus described in detail preferred embodiments of the present invention, it is to be understood that the invention defined by the appended claims is not to be limited to particular details set forth in the above description as many apparent variations thereof are possible without departing from the spirit or scope of the present invention.

What is claimed is:

1. A computer keyboard device comprising a decorative sealed vessel, comprising:
 a first liquid,
 a second liquid, and
 at least one structure,
 wherein the structure is insoluble in both the first and second liquids, and floats on the first liquid; the first and second liquids are immiscible; the first and second liquids have densities such that the first liquid is beneath the second liquid;
 wherein the structure can maintain its upright position and remain in suspension permanently; and
 wherein the decorative sealed vessel is an integral portion of the computer keyboard.

2. The computer keyboard device as claimed in claim 1 wherein the sealed vessel is positioned in place of a portion of a main housing of the keyboard.

3. The computer keyboard device as claimed in claim 1, wherein the structure resembles a decorative element.

4. The computer keyboard device as claimed in claim 1, wherein the decorative sealed vessel replaces a key of the computer keyboard.

5. The computer keyboard device as claimed in claim 1, wherein the decorative sealed vessel can resemble anything or anyone of a user's desire.

6. The computer keyboard device as claimed in claim 1, wherein the first liquid and the second liquid are both colorless.

7. The keyboard device as claimed in claim 1, wherein the first and the second liquid have contrasting or complimenting colors.

8. A method of forming a computer keyboard device comprising a decorative sealed vessel, comprising the steps of:
   providing a first liquid,
   providing a second liquid, and
   providing at least one structure, wherein the structure is insoluble in both the first and second liquids, and floats on the first liquid; the first and second liquids are immiscible; the first and second liquids have densities such that the first liquid is beneath the second liquid; and wherein the structure can maintain its upright position and remain in suspension permanently;
   retaining said first liquid, said second liquid and said at least one structure in said decorative sealed vessel; and
   integrally fixing the decorative sealed vessel as a portion of the computer keyboard.

9. The method of claim 8, wherein the sealed vessel is positioned in place of a portion of a main housing of the keyboard.

10. The method of claim 8, wherein the structure resembles a decorative element.

11. The method of claim 8, wherein the decorative sealed vessel replaces a key of the computer keyboard.

12. The method of claim 8, wherein the decorative sealed vessel can resemble anything or anyone of a user's desire.

13. The method of claim 8, wherein the first liquid and the second liquid are both colorless.

14. The method of claim 8, wherein the first and the second liquid have contrasting or complimenting colors.

* * * * *